United States Patent [19]
Mackeown

[11] Patent Number: 5,860,671
[45] Date of Patent: Jan. 19, 1999

[54] RETRACTABLE TRAILER HITCH

[75] Inventor: H. Roger Mackeown, Glendale, Ariz.

[73] Assignee: Pro-Hitch Manufacturing, Inc., Glendale, Ariz.

[21] Appl. No.: 689,530

[22] Filed: Aug. 8, 1996

[51] Int. Cl.⁶ ..................................................... B60D 1/06
[52] U.S. Cl. ........................................ 280/511; 280/491.5
[58] Field of Search ......................... 280/491.1, 491.5, 280/511, 901

[56] References Cited

U.S. PATENT DOCUMENTS

| | | | |
|---|---|---|---|
| 4,540,194 | 9/1985 | Dane | 280/901 |
| 5,016,898 | 5/1991 | Works et al. | 280/901 |
| 5,104,138 | 4/1992 | Allen | 280/901 |
| 5,169,168 | 12/1992 | Harry et al. | 280/511 |
| 5,346,240 | 9/1994 | Pettit | 280/491.1 |
| 5,435,585 | 7/1995 | Chambers | 280/901 |
| 5,472,222 | 12/1995 | Marcy | 280/901 |
| 5,527,055 | 6/1996 | Breslin | 280/511 |
| 5,571,270 | 11/1996 | Larkin | 280/901 |

*Primary Examiner*—Daniel G. DePumpo
*Attorney, Agent, or Firm*—Tod R. Nissle, P.C.

[57] ABSTRACT

A trailer hitch assembly positioned in the bed of a pickup truck permits a trailer ball hitch to be rotatably moved between a deployed position and a retracted position by utilizing only forces generated manually and by the force of gravity.

2 Claims, 4 Drawing Sheets

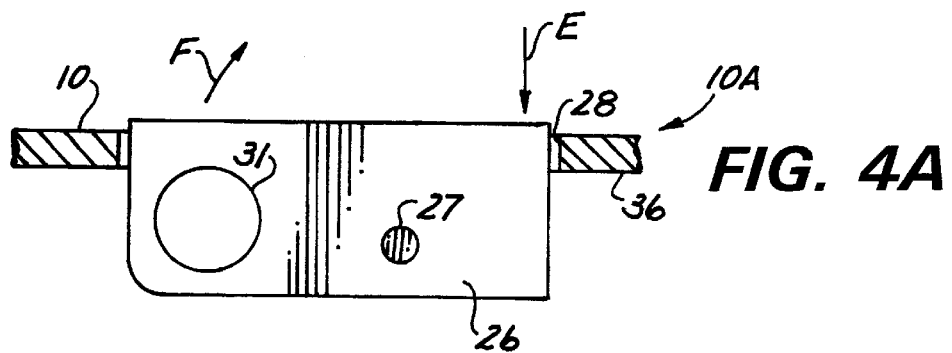
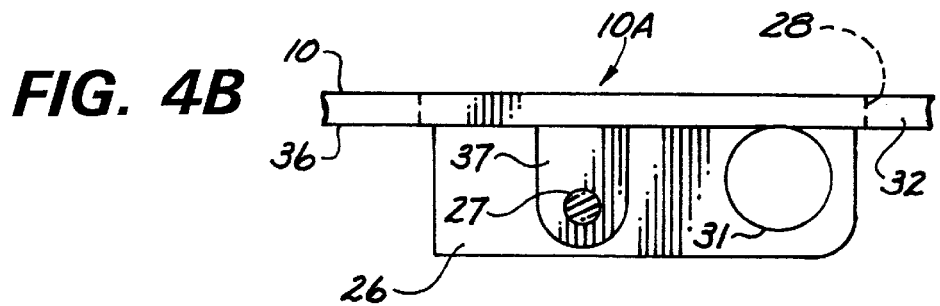
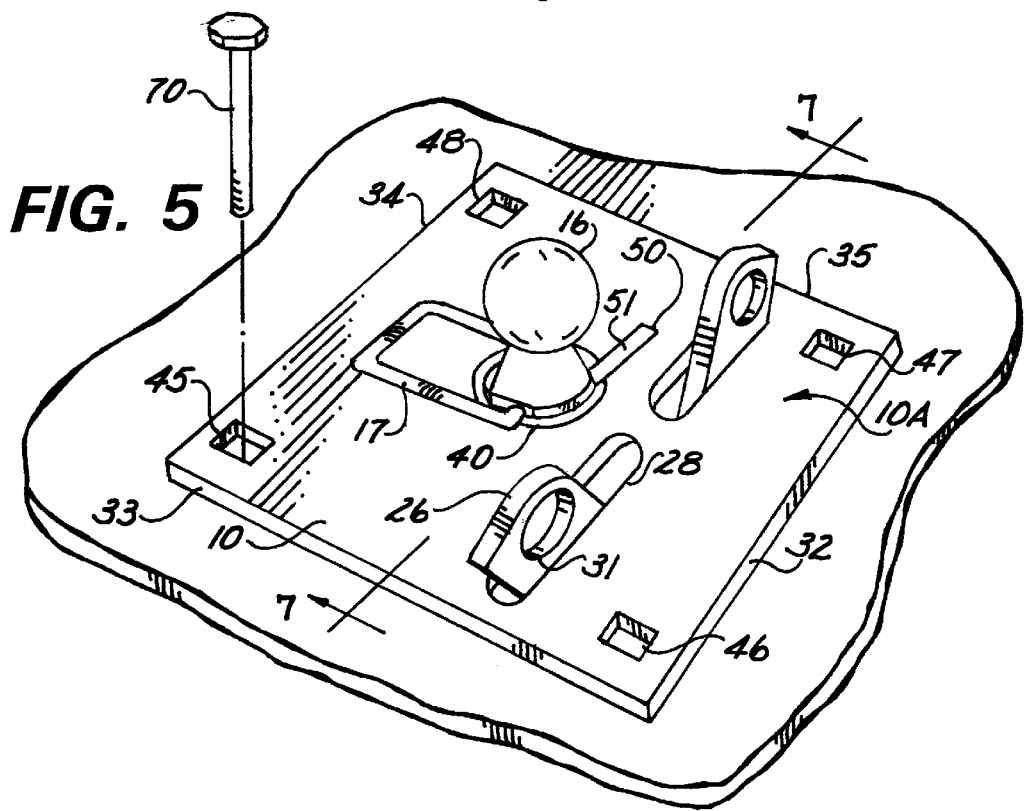

RETRACTABLE TRAILER HITCH

This invention relates to a retractable trailer hitch.

More particularly, the invention relates to a trailer hitch which is moved between a retracted position and a deployed position by displacing and rotating the hitch.

Systems for mounting a trailer hitch ball in the bed of a pickup truck is well known in the art. One prior art system secures a ball to the first end of an elongate plate or "tongue". The second end of the plate is pivotally attached to a fixed bolt. A hydraulic system pivots the plate about the bolt to move the first end of the plate between an elevated and a lowered position. When the first end is in the elevated position, the hitch ball is positioned above the bed of a pickup truck. When the first end is in the lowered position, the hitch ball is retracted to a position beneath the bed of a pickup truck. Other prior art hitch systems utilize springs, latch plates, or pins to mount a hitch ball on a vehicle. While each such prior art system enables the mounting of a hitch ball in a truck bed, a principal disadvantage of such systems is that they consist of relatively complicated mechanical structures. In particular, hydraulic systems, springs, etc. tend to require preventative maintenance and repair or replacement. Maintenancing such prior art hitch systems is labor intensive and often requires an individual to position himself beneath the bed of a pickup track to access the system.

Accordingly, it would be highly desirable to provide an improved trailer hitch system which would permit a hitch ball to be moved between a deployed and retracted position in the bed of a pickup track without requiring the use of springs, of a linkage system, or of a hydraulic system.

It would also be highly desirable to provide an improved trailer hitch system of the type described which would require minimal, if any, preventative maintenance.

Therefore, it is a principal object of the invention to provide an improved trailer ball hitch apparatus for the bed of a pickup truck or other vehicle.

A further object of the invention is to provide an improved trailer hitch system of the type described in which the forces necessary to displace a ball hitch between a retracted and deployed position in the bed of a pickup truck are supplied manually and by the force of gravity.

Another object of the invention is to provide an improved retractable trailer hitch system which approaches, or achieves, zero maintenance.

These and other, further and more specific objects and advantages of the invention will be apparent to those skilled in the art from the following detailed description thereof, taken in conjunction with the drawings, in which:

FIG. 4A is a side view illustrating a tie down pivotally connected to the mounting plate of FIG. 3;

FIG. 4B is a side view further illustrating the tie down of FIG. 4A;

FIG. 5 is a perspective view further illustrating the trailer hitch ball and body, mounting member, and plate of FIG. 3;

Briefly, in accordance with my invention, I provide a retractable hitch ball assembly for a truck bed including a mounting member adapted to be secured to the truck bed; at least one slot formed in the mounting member and including a first portion and a second portion canted with respect to the first portion; and, a hitch ball unit. The hitch ball unit includes a body shaped and dimensioned to be mounted adjacent the mounting member, and a movable member shaped and dimensioned to slidably move along the slot. The hitch ball unit is displaceable between at least two operative positions, a first retracted position, and a second deployed position. The hitch ball unit is displaced in a first direction of travel and turned in a second direction of travel different from the first direction of travel, and, the movable member moves along the first and second portions of the slot while the hitch ball unit moves from the first operative position to the second operative position.

Figure 1:
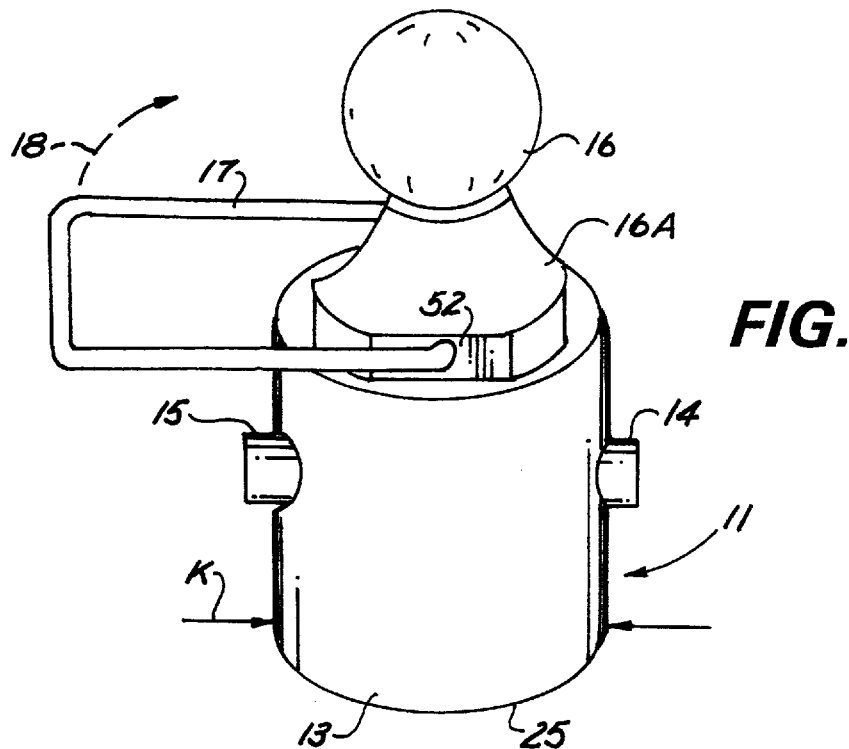
FIG. 1 is a perspective view illustrating a trailer hitch ball mounted on a body constructed in accordance with the principles of the invention.

Turning now to the drawings which depict the presently preferred embodiments of the invention for the purpose of describing the operation thereof and not by way of limitation of the scope of the invention, and in which like reference characters refer to corresponding elements throughout the several views, FIG. 1 illustrates a trailer hitch ball 16 attached to a neck 16A which is secured to solid cylindrical body 11. Opposed parallel flat surfaces 52 and 53 (FIG. 7) are formed at the bottom of neck 16A. The ends of U-shaped handle 17 are pivotally inserted in apertures formed in surfaces 52 and 53 such that handle 17 can be pivoted upwardly in the direction of arrow 18 and downwardly in a direction opposite that of arrow 18. Spaced apart cylindrical pins 14 and 15 are affixed to body 11. The longitudinal centerline of pin 14 is collinear with the longitudinal centerline of pin 15. Body 11 includes circular bottom surface 25 and cylindrical outer surface 13. The diameter of outer surface 13 is indicated by arrows K.

Figure 2:
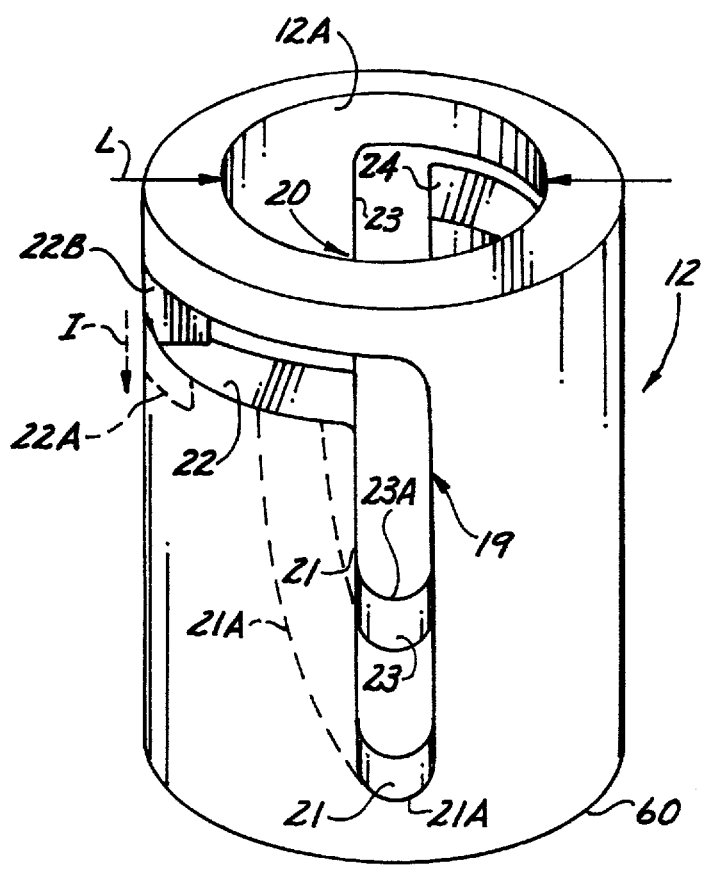
FIG. 2 is a front elevation view illustrating a mounting member for the hitch ball and body of FIG. 1 and constructed in accordance with the principles of the invention.

The hollow, cylindrical mounting member 12 illustrated in FIG. 2 includes circular bottom edge 60 and a pair of opposed L-shaped slots or tracks 19 and 20 formed therein. Slot 19 includes vertical portion 21 and horizontal portion 22. Portion 22 is perpendicular to portion 21, and is therefore canted with respect to portion 21. Slot 20 includes vertical portion 23 and horizontal portion 24. Portion 24 is perpendicular to portion 23 and is therefore canted with respect to portion 23. The diameter of the inner cylindrical wall 12A of member 12 is indicated by arrows L in FIG. 2. The diameter of wall 12A is slightly greater than the diameter of surface 13 such that surface 13 can freely slide within wall 12A.

Body 11 is mounted in member 12 such that pins 14 and 15 travel along slots 20 and 19, respectively, during operation of the hitch apparatus of the invention.

Figure 3:
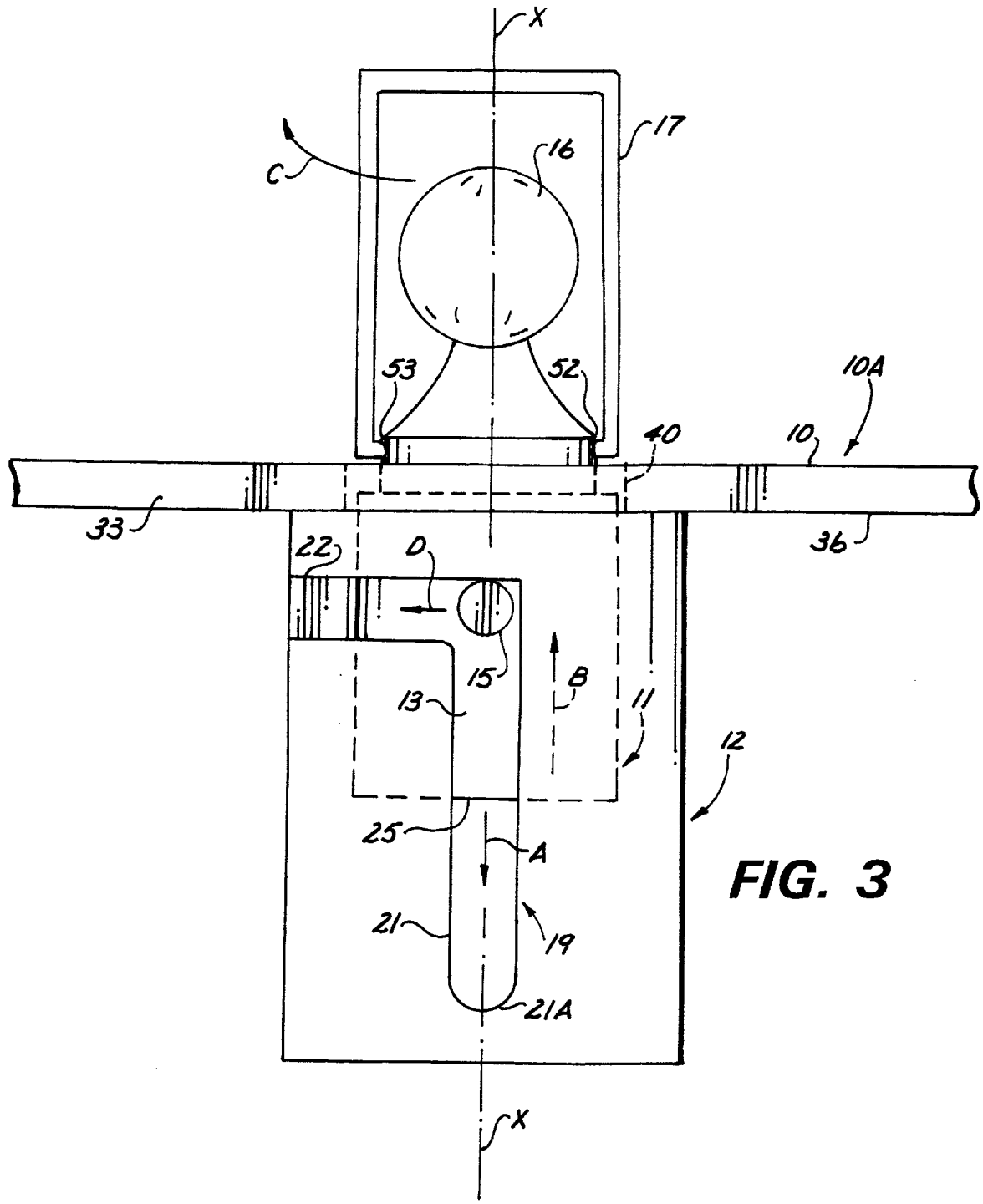
FIG. 3 is a side elevation view illustrating the trailer hitch ball and body of FIG. 1 and the mounting member of FIG. 2 in conjunction with a mounting plate which is normally affixed to the bed of a pickup truck or to another vehicle.
Figure 6:
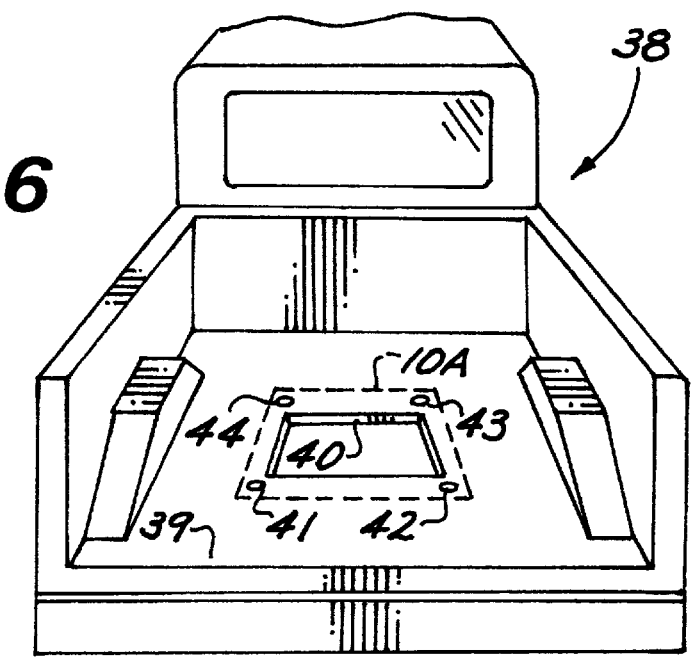
FIG. 6 is a perspective view illustrating the position of the plate-trailer hitch ball-mounting member assembly of FIG. 5 in the bed of a pickup truck; and, FIG. 7 is a side section view of the assembly of FIG. 5 taken along section line 7—7 thereof and illustrating additional internal construction details thereof.
Figure 7:
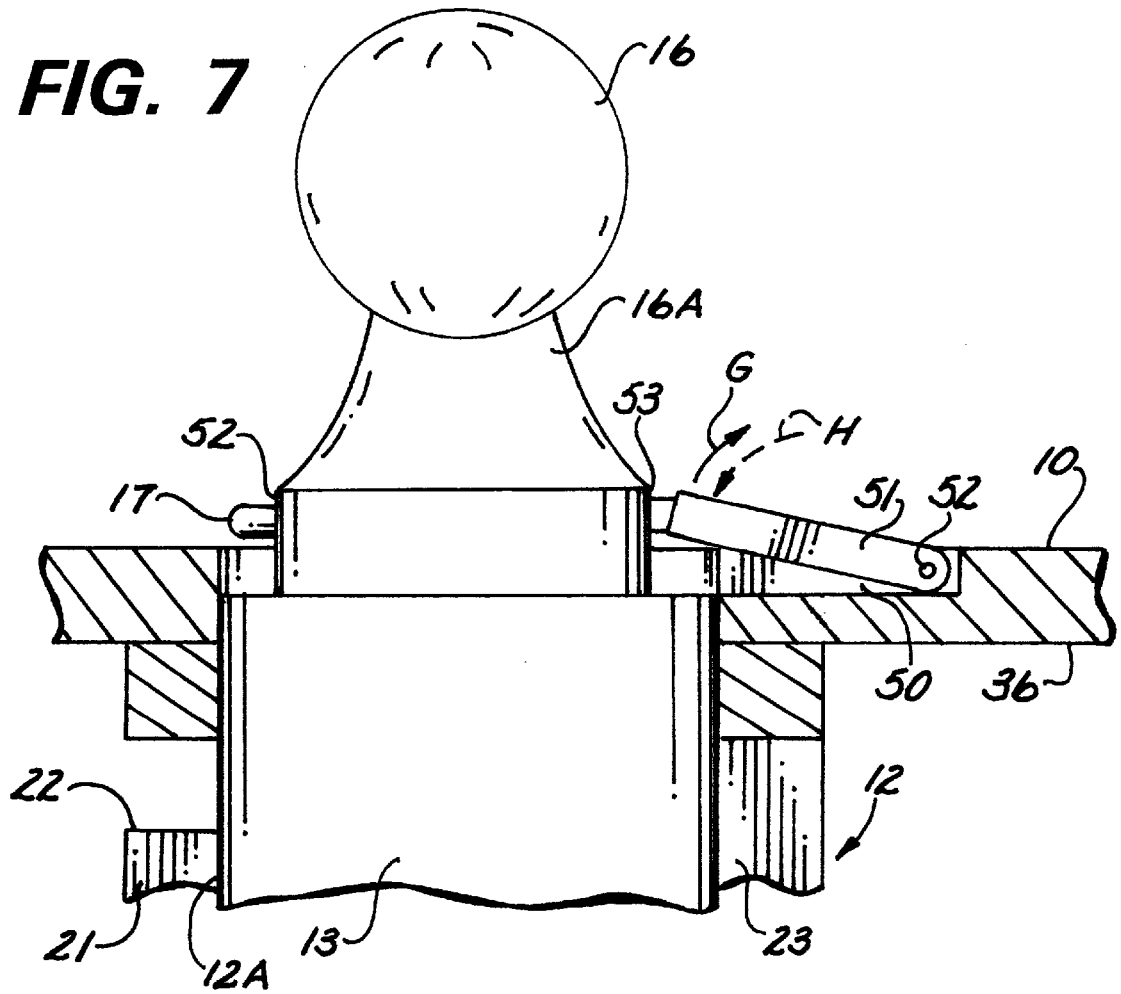

The upper end of member 12 is welded, bolted or otherwise affixed to the bottom surface 36 of square plate 10A in the manner shown in FIGS. 3 and 7. Plate 10A includes peripheral linear edges 32 to 35, top surface 10, and square apertures 45 to 48 formed therethrough (FIG. 5). Plate 10A is positioned over an opening 40 formed in the floor 39 of the bed of a pickup truck 38 in the manner indicated by dashed lines 10A in FIG. 6. When plate 10A is positioned in the manner shown in FIG. 6, apertures 45 to 48 in plate 10A align and are in registration with apertures 44, 41, 42, 43, respectively, formed in floor 39. Fasteners 70 extend through each aperture pair 44–45, 41–46, 42–47, and 43–48 to secure plate 10A in position on floor 39. As would be appreciated by those of skill in the art, a variety of additional support structures can be utilized to anchor plate 10A and/or member 12 to one or more structural members of truck 38.

The centerline of circular aperture 40 formed through plate 10A is collinear with the centerline of cylindrical surface 12A. The diameter of aperture 40 is presently preferably equal to the diameter of surface 12A.

Plate 10A preferably includes at least one slot 28 formed therethrough to receive a tie down member 26 pivotally attached to a member 37 by pin 27. Pin 27 is fixedly attached and normal to member 37. Member 37 is fixedly attached and normal to the bottom 36 of plate 10A. Aperture 31 is formed through tie down member 26.

Rectangular elongate lock pin 51 fits in groove 50 formed in plate 10A. One end of pin 51 is pivotally attached to plate 10A by pin 52. Lock pin 51 can be pivotally lifted in the direction of arrow G and dropped in the direction of arrow H.

In operation, when body 11 and ball 16 are in the retracted position, pin 15 is seated in the bottom 21A of portion 21 of slot 19 and pin 14 is seated in the bottom 23A of portion 23 of slot 20. When ball 16 is in the retracted positioned, ball 16 and handle 17 are positioned inside member 12 beneath the floor 39 of the bed of truck 28. To deploy ball 16, handle 17 is manually grasped and lifted upwardly in the direction indicated by dashed arrow B in FIG. 3 until pin 15 slides to a position at the top of portion 21 (as shown in FIG. 3) and pin 14 slides to a position at the top of portion 23.

When body 11 is in the position shown in FIG. 3, neck 16A has displaced pin 51 upwardly in the direction of arrow G. If desired, however, pin 51 can be displaced in the direction of arrow G before body 11 is lifted from its retracted position upwardly in the direction of arrow B to the position shown in FIG. 3.

Once body 11 is in the position shown in FIG. 3, handle 17 is manually turned in the direction of arrow C such that pin 15 travels through an arc of ninety degrees from portion 21 along portion 22 to the end 22B (FIG. 2) of portion 22 and such that pin 14 travels through an arc of ninety degrees from portion 23 along portion 24 to the end of portion 24. Once pins 14 and 15 reach the end of their respect portions 24 and 22 of slots 20 and 19, the flat surfaces 52 and 53 of the neck 16A are in the position shown in FIG. 7, and pin 51 can be displaced in the direction of arrow H to abut surface 53 in the manner shown in FIG. 5 and to prevent body 11 and ball 16 from rotating in a direction opposite that of arrow C. When ball 16 and body 11 are in the position illustrated in FIGS. 5 and 7, the ball 16 and body 11 are in the deployed position and ball 16 extends above the floor 39 of truck 38. In order to return ball 16 and body 11 to the retracted position, the procedure discussed above is reversed. Locking pin 51 is lifted in the direction of arrow G, and handle 17 is grasped and turned in a direction opposite that of arrow C to move pins 14 and 15 along portions 24 and 22, respectively, into portions 23 and 21, respectively such that body 11 is in the position shown in FIG. 3. Handle 17 can then be released, or lowered, to permit pins 14 and 15 of body 11 to slide down portions 23 and 21 under gravity until pins 14 and 15 seat in the bottoms 23A and 21A of portions 23 and 21, respectively. When pins 14 and 15 seat in the bottoms 23A and 21A, body 11 and ball 16 are in the retracted position.

The stowed position of tie down 26 is illustrated in FIGS. 4A and 4B. Tie down 26 is moved to its deployed position by pressing one end of tie down 26 in the direction of arrow E in FIG. 4A to rotate tie down 26 in the direction of arrow F to the position shown in FIG. 5. Tie down 26 is returned to its stowed position by rotating tie down 26 in a direction opposite that of arrow F to the position shown in FIGS. 4A and 4B.

One of the principal advantages of the hitch apparatus of the invention is that it is operated under the force of gravity and does not require springs, a linkage system, or a hydraulic system. Since the invention accomplishes this by lifting and rotating body 11, it can be appreciated that a variety of configurations can be utilized to accomplish the retraction and deployment of body 11. For example, each portion 21, 23 need not be perfectly vertical, but can be canted in the manner indicated by dashed lines 21A such that the lifting and rotation of body 11 are accomplished simultaneously when pins 14 and 15 slide upwardly along slots 21A. Or, a detent 22A can be formed at the end of each portion 22, 24 such that pins 14 and 15 seat in a detent 22A when they reach the end of their travel in the direction of arrow C in a slot 22, 24. Further, instead of fitting inside of member 12, body 11 can be enlarged and formed with an inner cylindrical hollow such that the inner cylindrical hollow in the enlarged body 11 slides over the outer cylindrical surface of member 12. Pins 14 and 15 are mounted on the inner cylindrical hollow in the enlarged body 11 and still travel along slots 19 and 20 in member 12 when handle 17 is used to move ball 16 between the retracted and deployed positions.

In still another embodiment of the invention, the L-shaped slots or tracks 19 and 20 are not formed through member 12 and, instead, an opposed pair of upraised L-shaped tracks are permanently formed on the inner cylindrical surface 12A of member 12. The first such L-shaped track has a portion having a length about equal to the length of portion 21 and has another portion having a length about equal to the length of portion 22. The second L-shaped track has a portion having a length about equal to the length of portion 24 and has another portion having a length about equal to the length of portion 23. Grooves are formed in the distal ends of pins 14 and 15 such that the grooves can slide along the L-shaped tracks when handle 17 is used to raise (or lower) and rotate body 11 between the retracted and deployed positions.

Having described my invention in such terms as to enable those skilled in the art to make and practice the invention, and having described the presently preferred embodiment thereof, I claim:

1. A retractable hitch ball assembly for a truck bed, said truck bed including a floor, said hitch ball assembly including a plate adapted to be attached to the truck mounting means having an axis substantially normal to said plate and adapted to be secured to said floor of the truck bed and to extend beneath said floor;

a hitch ball unit including (i) a body shaped and dimensioned to be movably mounted adjacent said mounting means and including an upper end and a lower end, and (ii) a hitch ball connected to said upper end of said body;

a cooperating locking pin and groove structure provided one on said hitch ball unit and the other on said mounting means, displacement means to lift, lower and rotate said hitch ball unit with respect to said mounting means and between at least two operative positions (iii) a first retracted position with said hitch ball positioned beneath said plate and adjacent said mounting means, and (iv) a second deployed position with said hitch ball extending above said plate and said mounting means;

said hitch ball unit being rotated about said axis with said displacement means and lifted with said displacement means in a direction substantially parallel to said axis to move said hitch ball unit from said first retracted position to said second deployed position, said groove including
- a first section which permits said locking pin to move up and down in said first section when said displacement means lifts and lowers said hitch ball unit, and
- a second section connected to said first section which permits said locking pin to move in said second section when said displacement means rotates said hitch ball unit about said axis.

2. A retractable hitch ball assembly for a truck bed, said truck bed including a floor, said hitch ball assembly including

- a plate adapted to be attached to the truck
- hollow mounting sleeve means having an axis generally normal to said plate and adapted to be secured to and extend beneath said floor;
- (b) a hitch ball unit including
  - (i) a body shaped and dimensioned to be movably mounted adjacent and inside said mounting means and including an upper end and a lower end, and
  - (ii) a hitch ball connected to said upper end of said body;

a cooperating locking pin and groove structure provided one on said hitch ball unit and the other on said mounting sleeve means, handle means attached to said hitch ball unit to lift, lower and rotate said hitch ball unit in said mounting means and between at least two operative positions
- a first retracted position with said hitch ball positioned beneath said plate and inside said mounting means, and
- a second deployed position with said hitch ball extending above said plate and outside of and above said mounting means;

said hitch ball unit being
- rotated about said axis, and
- lifted upwardly in a direction substantially parallel to said axis, with said handle means to move said hitch ball unit from said first retracted position to said second deployed position, said groove including
- a first section which permits said locking pin to move up and down in said first section when said handle means is utilized to lift and lower said hitch ball unit, and
- a second section connected to said first section which permits said locking pin to move in said second section when said handle means is used to rotate said hitch ball unit about said axis.

* * * * *